United States Patent [19]

Zimmerman

[11] Patent Number: 5,777,662
[45] Date of Patent: Jul. 7, 1998

[54] INGRESS/EGRESS MANAGEMENT SYSTEM

[75] Inventor: Dennis A. Zimmerman, Rockingham County, Va.

[73] Assignee: Comsonics, Inc., Harrisonburg, Va.

[21] Appl. No.: 703,773

[22] Filed: Aug. 27, 1996

[51] Int. Cl.⁶ .................... H04N 7/10; H04N 7/00
[52] U.S. Cl. .................... 348/6; 348/4; 348/12; 348/180; 455/5.1
[58] Field of Search ............... 348/6, 4, 5, 2, 348/1, 12, 13, 180, 181, 192; 455/5.1, 3.1, 1; H04N 7/10, 7/00

[56] References Cited

U.S. PATENT DOCUMENTS

| | | | |
|---|---|---|---|
| 4,072,899 | 2/1978 | Shimp . | |
| 4,413,229 | 11/1983 | Grant | 348/6 |
| 5,294,937 | 3/1994 | Ostteen et al. . | |
| 5,465,112 | 11/1995 | Nakao | 348/4 |
| 5,585,842 | 12/1996 | Chappell et al. | 348/192 |
| 5,608,428 | 3/1997 | Bush | 348/180 |

*Primary Examiner*—Mark R. Powell
*Assistant Examiner*—Virendra Srivastava
*Attorney, Agent, or Firm*—Whitham, Curtis & Whitham

[57] ABSTRACT

An RF ingress/egress management system is made up of three major components. (1) A headend monitoring receiver, that is frequency tunable from 5 to 50 MHz, is capable of decoding and reading a unique tone that is transmitted and enters a cable flaw and is returned to the headend via the upstream coaxial plant. (2) A mobile transceiver global positioning satellite (GPS) system receives RF egress in the 50 MHz to 1 GHz region and stamps a GPS coordinate and stores that information. Also, a 5 to to MHz transmitter modulated with GPS coordinates transmits sufficient power to enter the cable television system flaw and be received at the headend location via the headend monitor. (3) A computer software system quantifies the cable flaw at egress and ingress frequencies and assigns a coordinate and figure of merit so that a repair technician can expedite repair of the coaxial plant.

17 Claims, 5 Drawing Sheets

INGRESS/EGRESS MANAGEMENT SYSTEM

BACKGROUND OF THE INVENTION

1. Field of the Invention

The present invention generally relates to monitoring the radio frequency (RF) leaks in a coaxial cable communication system, such as a cable television (CATV) plant, and more particularly, to a management system that allows monitoring of the ingress and egress of RF energy in a coaxial plant and presenting management system information in a format that allows the best utilization of system maintenance resources.

2. Background Description

Conventional coaxial cable distribution systems use the 50 MHz to 1 GHz spectrum. This spectrum shares frequency allocations with conventional broadcasters and many other terrestrial and ground to air base communication channels, such as air traffic controller to airplane communication channels. It is extremely important that the levels used in the downstream portion of the coaxial plant do not egress or leak from the coaxial cable plant and propagate in the terrestrial environment and cause interference with these critical communication channels. This RF egress has been a concern in the telecommunications industry since the early 1980s, and the Federal Communications Commission (FCC) requires these frequencies to be monitored on a routine basis.

Mobile RF leak detectors have been used to comply with FCC regulations. One example is disclosed in U.S. Pat. No. 4,072,899 to Richard L. Shimp and assigned to the assignee of this invention. The Shimp RF leak detector detects RF leaks by transmitting a unique signal at the headend of the coaxial plant and, using a very narrow band receiver, detects the unique signal at locations of defects in the shielding.

Another example of a mobile RF leak detector is disclosed in U.S. Pat. No. 5,294,937 to Ostteen et al. In this example, RF leak detection is combined with a global positioning system (GPS) and a computer control unit to measure RF signal strength, while maintaining the corrected distance between the vehicle and the source of the leak. This data is stored for later analysis.

RF leak detectors have been a useful tool in the maintenance of coaxial cable plants; however, the demand for a greater number of channels, in both basic and premium services, and the advent of digital transmission have made it necessary to advance the state of the art in RF leak detectors for coaxial cable plants. The demand for a greater number of channels places a premium on the bandwidth requirements of the cable system, making it impractical to provide a unique signal dedicated for the detection of RF leaks, as in the Shimp RF leak detector.

Digital transmission also places a premium on the bandwidth requirements of the cable system but introduces another problem. Specifically, digital transmissions, unlike analog transmissions, are less susceptible to degeneration due to extraneous RF energy entering the coaxial cable. While this would seem to be an advantage, the problem is that a failure in the transmission is catastrophic. Thus, a subscriber may be enjoying a program without any hint of a problem and suddenly experience a complete loss of the program. On the other hand, with analog transmission, the subscriber will experience a degradation in the received program and, most likely, will notify the cable plant operator of the difficulty so that repairs can be made without total loss of service. In the case of digital transmissions, there is no such graceful failure, only a complete loss of service. Thus, it becomes important to detect extraneous RF energy entering (i.e., ingress) the coaxial cable so that repairs can be made before such loss of service occurs.

In another development, the telecommunications industry is rapidly upgrading coaxial plants to facilitate bi-directional communications services. Such services have been the subject of study for some time, but only recently have bi-directional services begun to be implemented on a widespread basis. An early example of bi-directional communications on a CATV coaxial plant is disclosed in U.S. Pat. No. 3,943,447 to Shomo and assigned to the assignee of this invention. The Shomo invention recognized the possibility of retrofitting existing plants for bi-directional communications. Modern distribution equipment, however, is specifically designed to support such bi-directional communications.

These new bi-directional communications services include plain old telephone service (POTS), internet access, high speed data exchange, interactive video, to name but a few of the more prominent services to be added in the coming years. In light of the new potential business opportunities in bi-directional services, the telecommunication industry is now actively pursuing the use of upstream signals in the 5 to 50 MHz spectrum (as opposed to the downstream 50 MHz to 1 GHz spectrum). These signals are particularly susceptible to ingress signals getting into the coaxial plant and combining on a power basis as they make their way through the network to the headend. Lack of ingress integrity in the 5 to 50 MHz region can render a bi-directional system useless.

RF leak detectors of the Shimp and Ostteen types have been used only to detect RF egress. In order to detect RF ingress, maintenance personnel have attempted to validate cable system integrity by driving around the cable plant with transmitters. This approach is clumsy and unable to provide correlation between ingress and egress and exact location of the mobile transmitter that is providing the test. What is needed is an RF leak detection system that allows one technician in a mobile vehicle to qualify a coaxial plant ingress and egress, stamping any cable faults with a coordinate and a figure of merit.

SUMMARY OF THE INVENTION

It is therefore an object of the present invention to provide an ingress and egress management system that provides coaxial cable plant maintenance personnel with information that facilitates the expeditious repair of the cable with the best utilization of system maintenance resources.

It is another object of the invention to provide an ingress/egress management system that monitors the downstream egress and the upstream ingress simultaneously and provide documentation of the severity of ingress/egress combined with coordinates and address locations where system integrity has been detected as failed.

According to the invention, the ingress/egress management system is made up of three major components:

A headend monitoring receiver that is frequency tunable from 5 to 50 MHz, capable of decoding and reading a unique tone that is transmitted and enters a cable flaw and is returned to the headend via the upstream coaxial plant.

A mobile global positioning satellite (GPS) system and a receiver capable of detecting egress in the 50 MHz to 1 GHz region and stamping a GPS coordinate and storing that information. Also, a 5 to 50 MHz transmitter modulated with GPS coordinates and other data that can transmit sufficient power to enter the cable television system flaw and be received at the headend location via the headend monitor.

A computer software system that quantifies the cable flaw at egress and ingress frequencies and assigns a coordinate and figure of merit so that a repair technician can expedite repair of the coaxial plant.

The invention is useful in the maintenance of coaxial plants and hybrid fiber optic and coaxial plants.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
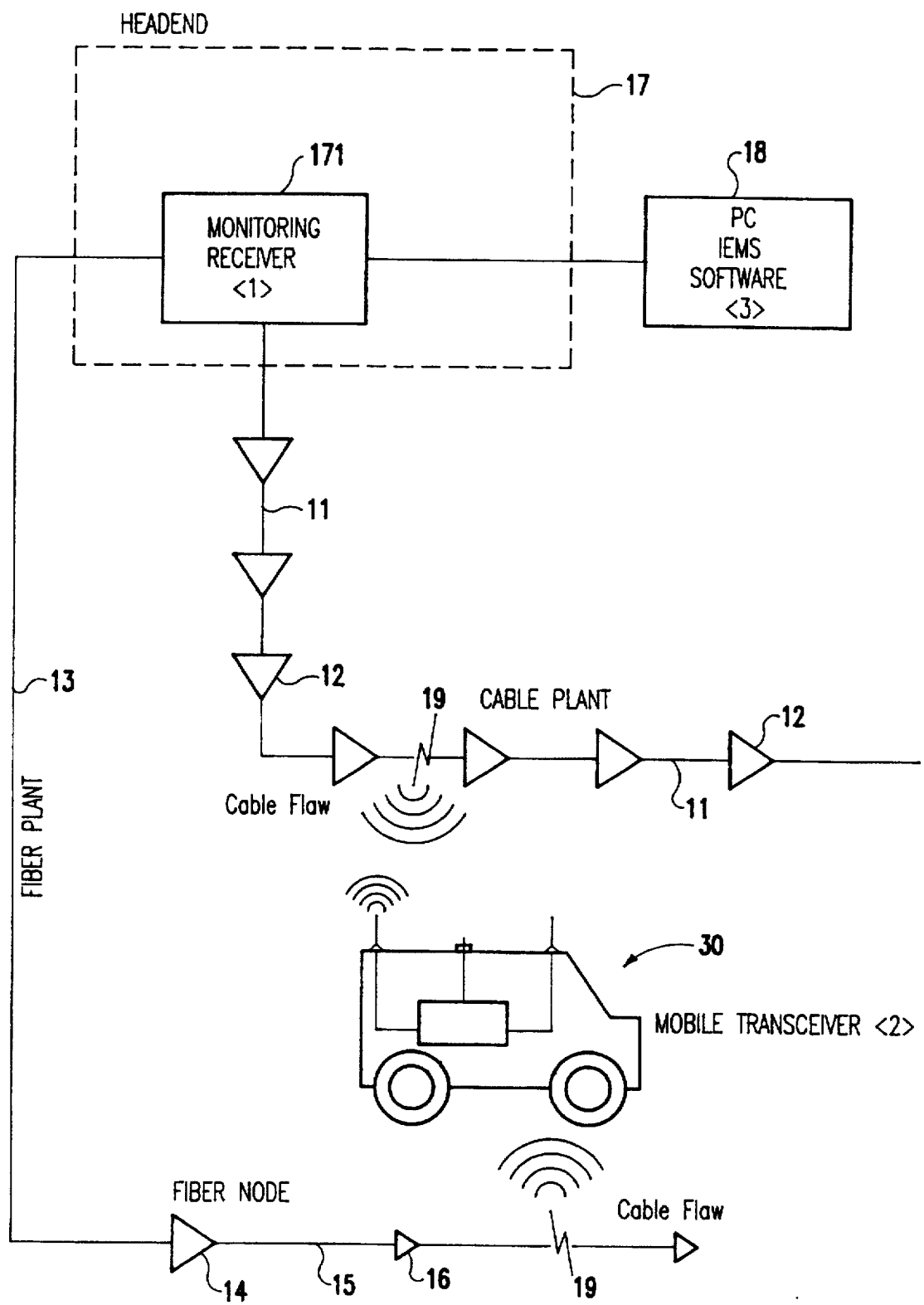
FIG. 1 is a schematic diagram illustrating the basic components of the ingress/egress management system according to a preferred embodiment of the invention.

Referring now to the drawings, and more particularly to FIG. 1, there is shown a schematic diagram of the ingress/ egress management system according to a preferred embodiment of the invention. A coaxial cable plant is represented by a coaxial cable 11 having a plurality of downstream bi-directional amplifiers 12 distributed along the length of the cable. Those skilled in the art will recognize that this is a very simplified representation of a coaxial cable plant and does not show branches, subscriber drops and the like, all of which characterize a typical coaxial cable plant. A hybrid fiber optic and coaxial cable plant is represented by a fiber cable 13 which terminates in a fiber node 14, at which an optical signal is converted to an electrical signal, and a coaxial cable 15 having a plurality of downstream amplifiers 16. Again, those skilled in the art with recognize this as a very simplified representation of a hybrid fiber optic and coaxial cable plant.

Both the coaxial cable plant and the hybrid fiber optic and coaxial cable plant emanate from a headend 17 which includes a monitoring receiver 171. The output of this receiver is supplied to the computer software system 18. In the schematic illustration of FIG. 1, cable flaws are indicated by the reference numeral 19. It is the function of the mobile transceiver and GPS system 30 to locate these flaws in a manner which allows the computer software system 18, in response to the output from monitoring receiver 171, to quantify the cable flaws at egress and ingress frequencies and assign a coordinate and figure of merit. Cable flaws are frequency dependent, depending on the location of the flaw and its connection to the physical plant, i.e., drop wires, anchors, and other telephone and electric plant in the proximity of the flaw.

Figure 2:
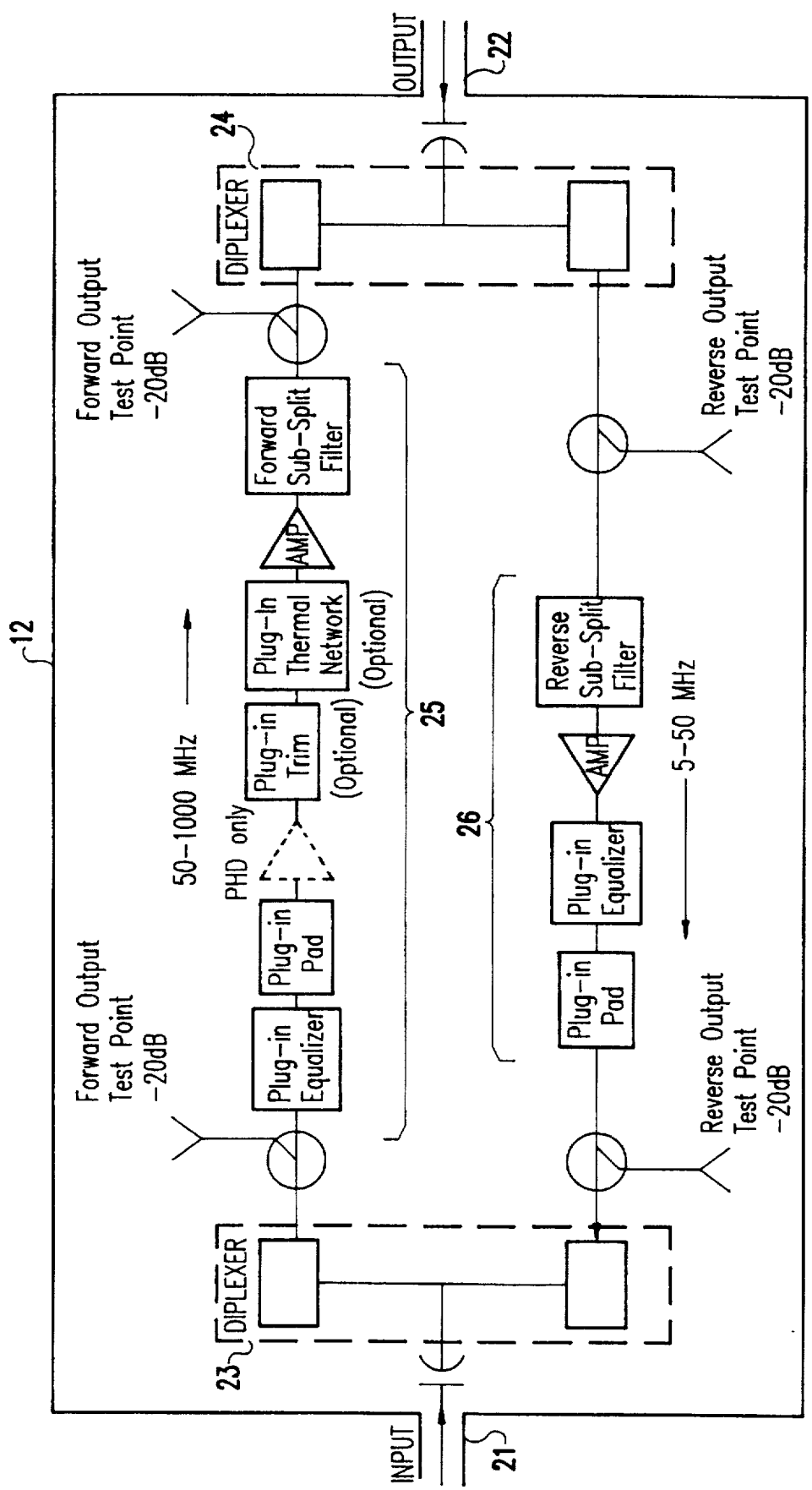
FIG. 2 is a block diagram of a typical bi-directional distribution amplifier as used in the cable plant of FIG. 1.

FIG. 2 is a block diagram of a bi-directional amplifier 12 as used in the coaxial cable plant shown in FIG. 1. This amplifier has a coaxial input 21 and a coaxial output 22. The input and output are connected to respective diplexers 23 and 24 having connected therebetween a down stream amplifier 25, with equalizing and filter circuits, for transmitting signals in the range of 50 MHz to 1 GHz and an up stream amplifier 26, also with equalizing and filter circuits, for transmitting signals in the range of 5 to 50 MHz.

Figure 3:
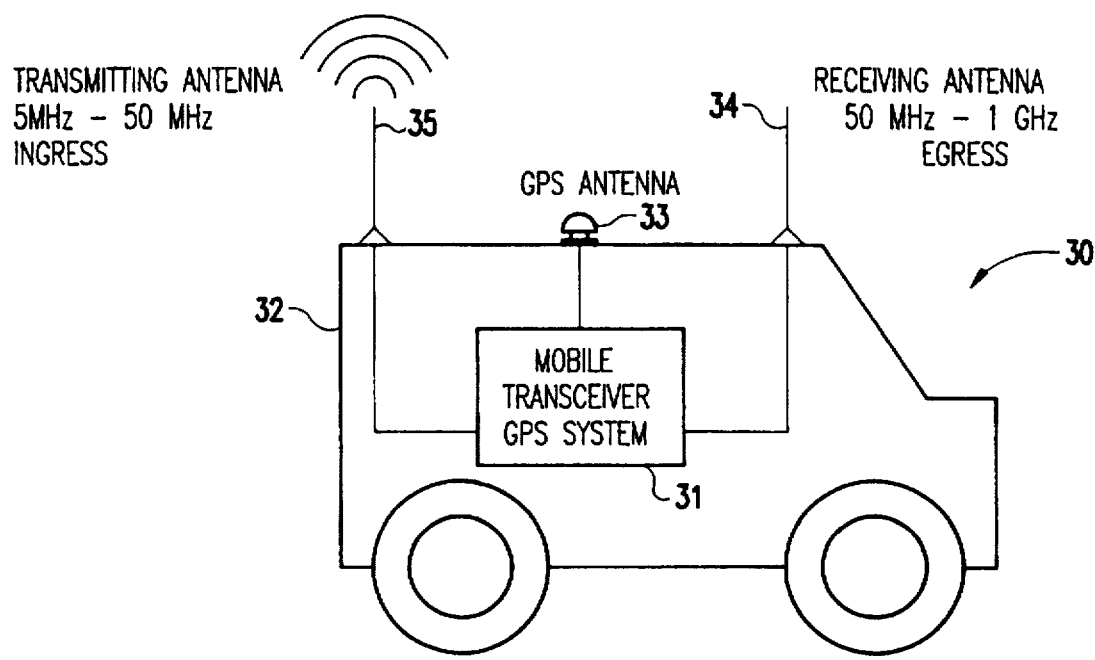
FIG. 3 is a block diagram showing in more detail the mobile unit used in the ingress/egress management system shown in FIG. 1.

FIG. 3 shows the mobile transceiver and GPS system 30 in more detail. This transceiver comprises a transceiver and GPS system 31 mounted in a vehicle 32, such as a maintenance truck. The GPS system includes a receiver connected to a GPS antenna 33. Thus, data is received from which the coordinates of the vehicle 32 can be computed. The transceiver includes a receiver capable of receiving RF egress from the coaxial cable plant in the 50 MHz to 1 GHz region via the receiving antenna 34. Any such RF egress received is stamped with a GPS coordinate and this information is stored in the transceiver for later downloading and analysis by the computer software system 18. Also, the transceiver includes a 5 to 50 MHz transmitter modulated with GPS coordinates. This transmitter transmits via antenna 35 at sufficient power to enter the coaxial cable system flaw and be received a the headend location via the headend receiver 171.

Figure 4:
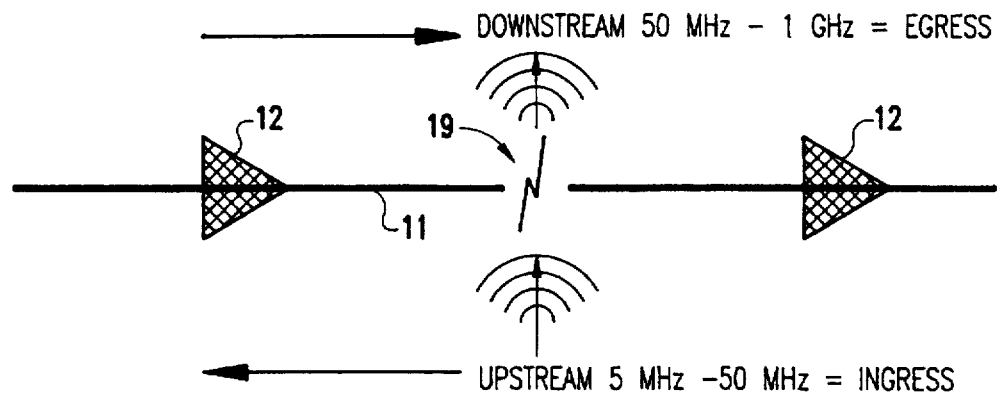
FIG. 4 is a pictorial representation illustrating the ingress and egress of RF energy at the site of a defect in a coaxial cable.

FIG. 4 illustrates the types of RF leaks detected. Here, a flaw 19 is shown between two amplifiers 12. The downstream RF energy in the 50 MHz to 1 GHz range will egress from the fault 19 and be detected by the mobile transceiver 31. The frequency of the RF energy detected is stored with the GPS coordinates for later analysis. Simultaneously, the GPS modulated RF energy in the 5 to 50 MHZ range transmitted by the mobile transceiver enters the cable at the flaw 19 and propagates to the headend monitoring receiver 171. The headend monitoring receiver thus is always aware of ingress leaks when they are accompanied by sufficient ingress (loss of integrity) from the GPS tagged ingress transmitter signal. Cable flaws with sufficient integrity at 5 to 50 MHz but failing in the 50 MHz to 1 GHz region are stored in the mobile transceiver and GPS system 31 for comparison and correlation at the end of the work day by the computer software system 18.

The headend monitoring receiver 171, when not directly being used in conjunction with a mobile transceiver and GPS system 30, can be tuned in the 5 to 50 MHz band to a strong ingress potential transmitter in the service area to continuously monitor the coaxial plant for ingress. One example of such a transmitter is a citizen's band transmitter transmitting at 27 MHz. In addition, the headend monitoring receiver can be multiplexed to look at multiple legs or multiple headend receivers assigned to unique upstream legs of the coaxial plant to enhance resolution in this mode.

Figure 5:
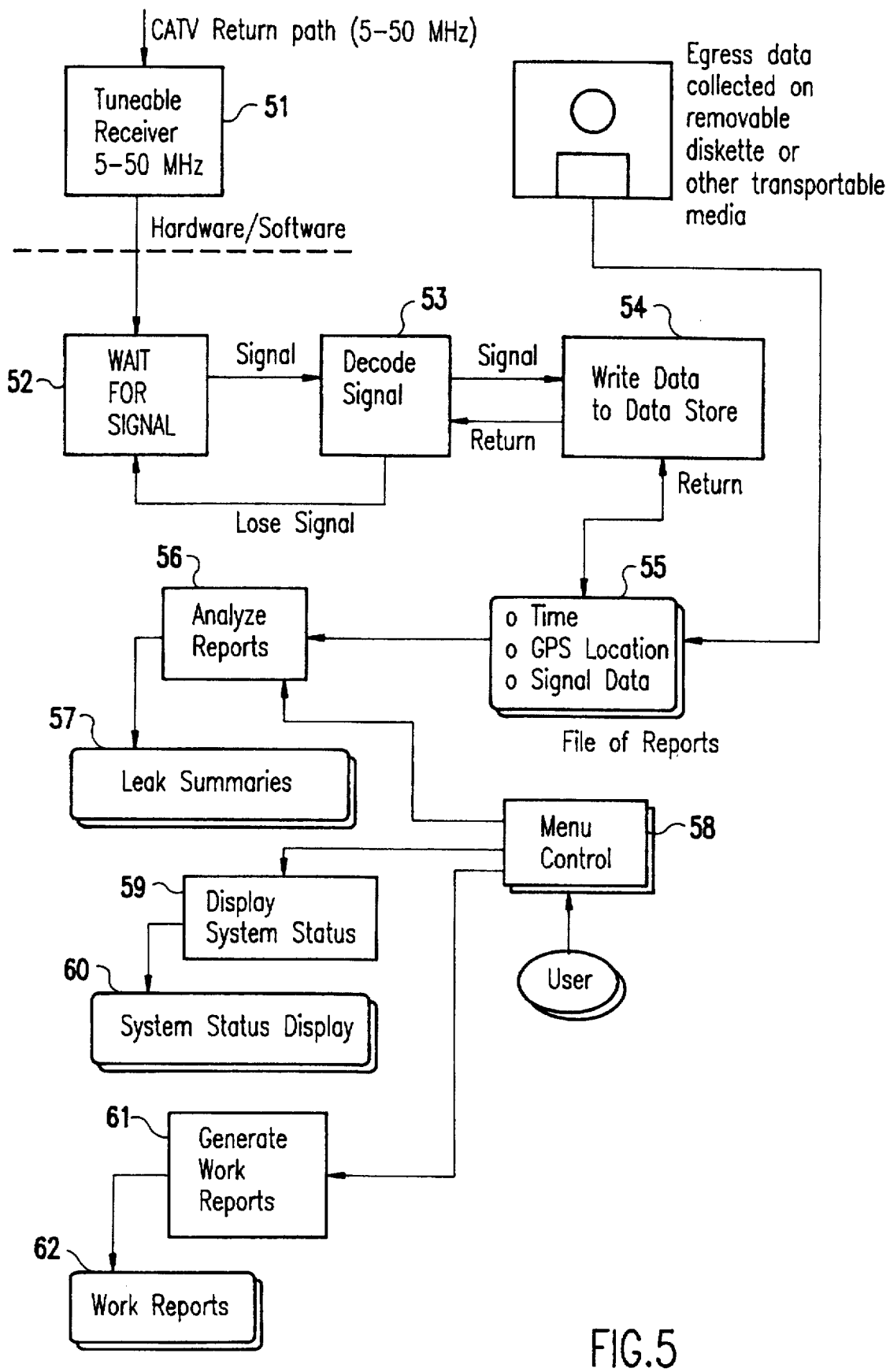
FIG. 5 is a flow diagram of the software implemented on the headend computer of the ingress/egress management system according to a preferred embodiment of the invention.

FIG. 5 is a flow diagram showing the software implemented on the computer software system 18. A tunable receiver 51 detects RF signals in the 5 to 50 MHz band and provides an output to the computer software. When a signal is detected at function block 52, the detected signal is output to decoding function 53 which decodes the signal. Should the signal be lost during the decoding process, a return is made to function block 52 to wait for detection of the signal. The decoded information includes signal strength and the GPS coordinates which were stamped on the ingress RF signal and a time stamp. This information is written to a data store in function block 54 as the signal is decoded.

Stored data from the data store is then read from the data store in operation block 55 as a series of reports. These reports are analyzed in function block 56, and leak summaries are output at 57. This operation is performed under user control in response to selections from a menu 58. In addition to analyzing reports, the user may also select a display of system status function 59, which generates a system status display output 60, and a generate work reports function 61, generates a work reports output 62.

Figure 6:
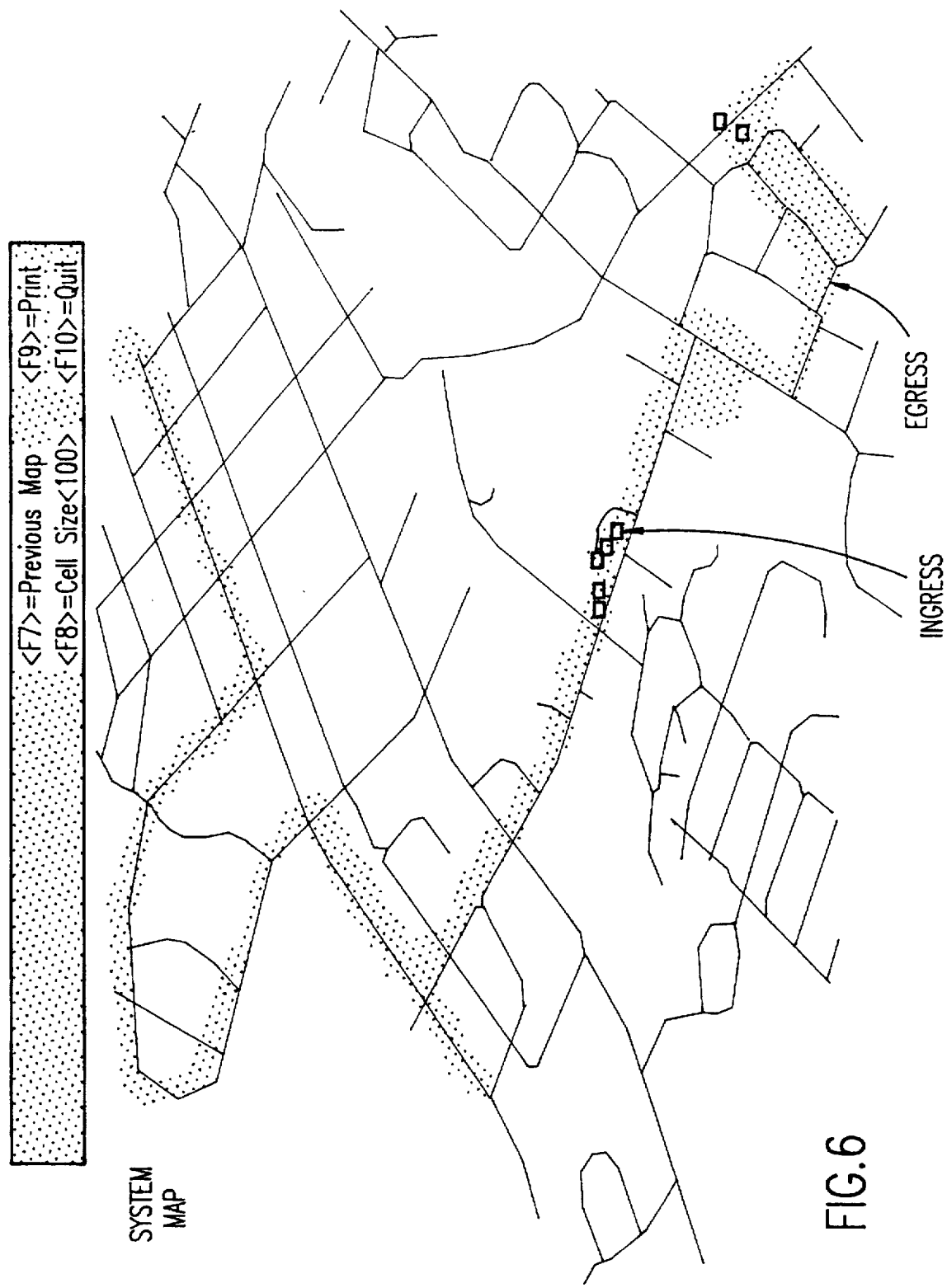
FIG. 6 is map showing the ingress and egress locations as determined by the computer software system of the invention.

The leak summaries output 57 include a map, generated from a map database, with the locations of points of ingress and egress. Such a map is shown in FIG. 6. This map provides the technician with a clear indication of where work is to be performed as output in the work reports output 62.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. An RF (radio frequency) ingress/egress management system for a coaxial cable communications plant comprising:

a headend monitoring receiver that is frequency tunable from 5 to 50 MHZ, capable of decoding and reading a unique tone that is transmitted and enters a cable flaw and is returned upstream to the headend monitoring receiver;

a mobile transceiver and global positioning satellite (GPS) system capable of receiving egress in the 50 MHZ to 1 GHz region and stamping a GPS coordinate and storing that information;

a 5 to 50 MHZ transmitter modulated with GPS coordinates that can transmit sufficient power to enter the cable flaw and be received at the headend monitoring receiver; and a computer software system that receives information from the mobile transceiver and GPS system and the headend monitoring receiver and quantifies detected cable flaws at egress and ingress frequencies and assigns coordinates and figures of merit so that a repair technician can expedite repair of the coaxial cable communications plant.

2. The RF ingress/egress management system as recited in claim 1 wherein said 5 to 50 MHZ transmitter is further modulated with time information, said headend monitoring receiver decoding received signals to generate signal strength, GPS location and time data.

3. The RF ingress/egress management system as recited in claim 2 wherein said computer software system analyzes said signal strength, GPS location, and time data to generate leak summaries and a map showing locations and types of leaks.

4. A method of managing a coaxial cable communications plant for RF (radio frequency) ingress/egress comprising the steps of:

monitoring at a headend of the coaxial cable communications plant signals in a frequency band from 5 to 50 MHZ;

decoding and reading a unique tone that is transmitted and enters a cable flaw and is returned upstream to the headend;

receiving, in a mobile unit, global positioning satellite (GPS) system signals;

receiving, in said mobile unit, egress from the coaxial cable communications plant signals in the 50 MHZ to 1 GHz region;

stamping a GPS coordinate and storing received signal information;

transmitting from said mobile unit signals in a band from 5 to 50 MHZ modulated with GPS coordinates with sufficient power to enter the cable flaw and be received at the headend;

receiving information from the mobile unit and decoded information received at the headend; and quantifying detected cable flaws at egress and ingress frequencies and assigning coordinates and figures of merit so that a repair technician can expedite repair of the coaxial cable communications plant.

5. The method of managing a coaxial cable communications plant as recited in claim 4, further comprising the step of modulating the signal in the 5 to 50 MHZ band with time information, wherein the step of decoding at the headend generates signal strength, GPS location and time data.

6. The method of managing a coaxial cable communications plant as recited in claim 5 further comprising the step of analyzing said signal strength, GPS location, and time data to generate leak summaries and a map showing locations and types of leaks.

7. A system for detecting radio frequency (RF) leaks in a two-way coaxial cable communication system distributed over a geographical area, comprising:

a mobile unit for moving around the geographical area near a coaxial cable path, said mobile unit comprising:

a position location means for determining a current geographical position of said mobile unit;

an egress receiver for receiving RF signals from an egress leak in said coaxial cable;

storage means for storing the current geographical position where said egress leak was detected; and an ingress transmitter for transmitting a signal encoded with the current geographical position to enter said coaxial cable at an ingress leak; and a headend unit positioned at a headend of said two-way coaxial cable communication system, comprising:

a ingress receiver for receiving the current geographical position traveling upstream in said coaxial cable from said ingress leak; and storage means for storing the current geographical position of said ingress leak.

8. A system for detecting radio frequency (RF) leaks in a two-way coaxial cable communication system as recited in claim 7 further comprising a controller means for mapping stored ingress leaks and egress leaks on a map of the geographical area.

9. A system for detecting radio frequency (RF) leaks in a two-way coaxial cable communication system as recited in claim 7 wherein said a position location means is a global positioning satellite (GPS) system.

10. A system for detecting radio frequency (RF) leaks in a two-way coaxial cable communication system as recited in claim 7 wherein said egress receiver receives frequencies in the range of 50 MHZ and 1 GHz, and said ingress receiver receives frequencies in the range of 5 MHZ to 50 MHZ.

11. A system for detecting radio frequency (RF) leaks in a two-way coaxial cable communication system as recited in claim 7 wherein said mobile unit comprises a vehicle driving around the geographical area.

12. A system for detecting radio frequency (RF) leaks in a two-way coaxial cable communication system as recited in claim 7 wherein said cable system comprises fiber optic cable and coaxial cable.

13. A system for detecting radio frequency (RF) leaks in a two-way coaxial cable communication a recited in claim 7 wherein egress leaks detected by said mobile unit are stored on a removable media which is connectable to said controller unit at said headend to be read.

14. A system for detecting radio frequency (RF) leaks in a two-way coaxial cable communication as recited in claim 12 wherein said removable media is magnetic.

15. A system for detecting radio frequency (RF) leaks in a two-way coaxial cable communication system as recited in claim 8 wherein said controller means further uses position data for ingress leaks and egress leaks to generate work reports for maintaining said communication system.

16. A system for detecting radio frequency (RF) leaks in a two-way coaxial cable communication system as recited in claim 8 wherein said controller comprises a graphical user interface.

17. A system for detecting radio frequency (RF) leaks in a two-way coaxial cable communication system as recited in claim 7 further comprising a clock for time stamping ingress leaks and egress leaks when detected.

* * * * *